United States Patent
Choi et al.

(10) Patent No.: US 11,968,145 B2
(45) Date of Patent: *Apr. 23, 2024

(54) METHOD FOR TRANSMITTING SRS AND TERMINAL THEREFOR

(71) Applicant: LG Electronics Inc., Seoul (KR)

(72) Inventors: Kukheon Choi, Seoul (KR); Jiwon Kang, Seoul (KR); Kyuseok Kim, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

This patent is subject to a terminal disclaimer.

(21) Appl. No.: 18/075,933

(22) Filed: Dec. 6, 2022

(65) Prior Publication Data

US 2023/0121186 A1 Apr. 20, 2023

Related U.S. Application Data

(63) Continuation of application No. 16/629,909, filed as application No. PCT/KR2018/001275 on Jan. 30, 2018, now Pat. No. 11,558,161.

(Continued)

(51) Int. Cl.
*H04L 5/00* (2006.01)
*H04L 1/06* (2006.01)

(52) U.S. Cl.
CPC .............. *H04L 5/0051* (2013.01); *H04L 1/06* (2013.01); *H04L 5/0023* (2013.01)

(58) Field of Classification Search
CPC ........ H04L 5/0051; H04L 1/06; H04L 5/0023
See application file for complete search history.

(56) References Cited

U.S. PATENT DOCUMENTS 8,817,719 B2* 8/2014 Behravan .............. H04L 5/0094
455/450
2012/0008588 A1* 1/2012 Chung ................. H04B 7/0613
370/329

(Continued)

FOREIGN PATENT DOCUMENTS

CN 106664193 5/2017
CN 106850023 6/2017

(Continued)

OTHER PUBLICATIONS

Qualcomm, "Discussion on SRS Design", 3GPP TSG RAN WG1 NR Ad-Hoc#2, R1-1711174. Jun. 26, 2017. Sections: 1, 2.2, Fig. 2, 2.4.1, 2.4.2 (Year: 2017).*

(Continued)

*Primary Examiner* — Huy D Vu
*Assistant Examiner* — Robert Ma
(74) *Attorney, Agent, or Firm* — Fish & Richardson P.C.

(57) ABSTRACT

A method by which a terminal transmits an SRS can comprise the steps of: receiving, from a base station, first information indicating symbols to which the SRS is transmitted among a plurality of symbols, when the terminal is configured to perform antenna switching for an SRS transmission on the plurality of symbols; and transmitting the SRS on the indicated symbols, wherein the SRS is transmitted through antenna ports respectively corresponding to the indicated symbols, and the antenna ports respectively corresponding to the indicated symbols can be different from each other.

14 Claims, 15 Drawing Sheets

Related U.S. Application Data

(60) Provisional application No. 62/537,491, filed on Jul. 27, 2017.

(56) References Cited

U.S. PATENT DOCUMENTS

| | | |
|---|---|---|
| 2014/0098837 A1 | 4/2014 | Mehta et al. |
| 2017/0195033 A1 | 7/2017 | Zhang et al. |

FOREIGN PATENT DOCUMENTS

| | | |
|---|---|---|
| EP | 2313989 | 7/2017 |
| JP | 2017508355 | 3/2017 |
| KR | 101740371 | 6/2017 |
| WO | WO2010110568 | 9/2010 |

OTHER PUBLICATIONS

Huawei, "SRS Antenna Switching", 3GPP TSG RAN WG1 NR Ad Hoc Meeting, R1-1709938, section 1, Agreements. Jun. 27-30, 2017 (Year: 2017).*
CATT, "Discussion on UL beam management," R1-1707476, 3GPP TSG RAN WG1 Meeting #89, Hangzhou, P.R. China, dated May 15-19, 2017, 3 pages.
EP Extended European Search Report in European Appln. No. 18838711.2, dated Mar. 10, 2021, 10 pages.
Guangdong OPPO Mobile Telecom, "Discussion on the UL Beam Management," R1-1707697, 3GPP TSG RAN WG1 Meeting #89, Hangzhou, P.R. China, dated May 15-19, 2017, 5 pages.
Huawei, HiSilicon, "SRS antenna switching," R1-1709938, 3GPP TSG RAN WG 1 NR Ad Hoc Meeting, Qingdao, China, dated Jun. 27-30, 2017, 4 pages.
Huawei, HiSilicon, "UL beam management," R1-1704231, 3GPP TSG RAN WG1 Meeting #88b, Spokane, USA, dated Apr. 3-7, 2017, 7 pages.
Huawei, HiSilicon, "UL beam management," R1-1706925, 3GPP TSG RAN WG1 Meeting #89, Hangzhou, China, dated May 15-19, 2017, 6 pages.
Huawei, HiSilicon, "UL beam management," R1-1709928, 3GPP TSG RAN WG1 NR Ad Hoc Meeting, Qingdao, China, dated Jun. 27-30, 2017, 5 pages.
Huawei, HiSilicon, "UL SRS design for beam management, CSI acquisition," R1-1706938, 3GPP TSG RAN WG1 Meeting #89, Hangzhou, China, dated May 15-19, 2017, 9 pages.
International Search Report and Written Opinion in International Application No. PCT/KR2018/001275, dated Apr. 24, 2018, 21 pages (with English translation).
JP Office Action in Japanese Appln. No. 2020-502190, dated Mar. 30, 2021, 11 pages (with English translation).
LG Electronics, "Considerations on NR SRS design," R1-1611808, Presented at 3GPP TSG RAN WG1 Meeting #87, Reno, USA Nov. 14-18, 2016, 6 pages.
LG Electronics, "Considerations on NR SRS design," R1-1702465, Presented at 3GPP TSG RAN WG1 Meeting #88, Athens, Greece Feb. 13-17, 2017, 4 pages.
LG Electronics, "Discussion on UL beam management," R1-1707605, 3GPP TSG RAN WG1 Meeting #89, Hangzhou, China, dated May 15-19, 2017, 6 pages.
LG Electronics, "Further details on SRS capacity improvement schemes," R1-155398, Presented at 3GPP TSG RAN WG1 Meeting #82bis, Malmö, Sweden, Oct. 5-9, 2015, 4 pages.
LG Electronics, "On SRS design and related operations," R1-1710298, Presented at 3GPP TSG RAN WG1 NR Ad-Hoc#2, Qingdao, P.R. China Jun. 27-30, 2017, 8 pages.
Notice of Allowance in Chinese Appln. No. 201880049902.0, dated Aug. 29, 2022, 4 pages.
Office Action in Chinese Appln. No. 201880049902.0, dated Dec. 24, 2021, 15 pages (with English translation).
Office Action in Singaporean Appln. No. 11201913228Y, dated Aug. 24, 2021, 9 pages.
Qualcomm Incorporated, "Discussion on SRS Design," R1-1711174, 3GPP TSG RAN WG1 NR Ad-Hoc#2, Qingdao, P.R. China, dated Jun. 27-30, 2017, 8 pages.

* cited by examiner frequency

Example of allocating SRS to symbols n and n+2

Example of allocating SRS to symbols n+1 and n+3

Case in which SRS resource = 2

Case in which SRS resource = 4

METHOD FOR TRANSMITTING SRS AND TERMINAL THEREFOR

CROSS-REFERENCE TO RELATED APPLICATIONS

This application is a continuation of U.S. application Ser. No. 16/629,909, filed on Jan. 9, 2020, which is a National Stage application under 35 U.S.C. § 371 of International Application No. PCT/KR2018/001275, filed on Jan. 30, 2018, which claims the benefit of U.S. Provisional Application No. 62/537,491, filed on Jul. 27, 2017. The disclosures of the prior applications are incorporated by reference in their entirety.

TECHNICAL FIELD

The present disclosure relates to a wireless communication system, and more particularly, to a method of transmitting a sounding reference signal (SRS) and terminal therefor.

BACKGROUND

With the introduction of a new radio access technology (RAT) system, as more and more communication devices require greater communication capacity, there is a need for mobile broadband communication enhanced over conventional Radio Access Technology (RAT).

In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

SUMMARY

An object of the present disclosure is to provide a method for a terminal to transmit an SRS.

Another object of the present disclosure is to provide a terminal for transmitting an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, provided herein is a method of transmitting an SRS by a user equipment (UE). The method may include: when the UE is configured to perform antenna switching for SRS transmission in a plurality of symbols, receiving from a base station (BS) first information on symbols for transmitting the SRS among the plurality of symbols; and transmitting the SRS in the indicated symbols. The SRS may be transmitted on antenna ports respectively corresponding to the indicated symbols. The antenna ports respectively corresponding to the indicated symbols may be different from each other. A symbol located between the indicated symbols may be set to an empty symbol in which no signal is transmitted.

The method may further include receiving from the BS second information on whether an empty symbol is configured between the indicated symbols. The method may further include receiving from the BS third information including antenna port indexes of the antenna ports respectively corresponding to the indicated symbols.

The method may further include transmitting to the BS information on antenna switching capability for the SRS transmission.

The method may further include receiving from the BS a message requesting the information on the antenna switching capability for the SRS transmission. The information on the antenna switching capability for the SRS transmission may be transmitted in response to the message.

The information on the antenna switching capability for the SRS transmission may include information on a subcarrier spacing of the UE or information on a transition time period for the antenna switching. The first information may correspond to a bitmap type of information. The second information may be received through any one of radio resource control (RRC), a medium access control channel element (MAC CE), or downlink control information (DCI).

In another aspect of the present disclosure, provided herein is a UE for transmitting an SRS. The UE may include: a receiver; a transmitter; and a processor. The processor may be configured to: when the UE is configured to perform antenna switching for SRS transmission in a plurality of symbols, control the receiver to receive from a BS first information on symbols for transmitting the SRS among the plurality of symbols; and control the transmitter to transmit the SRS in the indicated symbols and on antenna ports respectively corresponding to the indicated symbols. The antenna ports respectively corresponding to the indicated symbols may be different from each other.

The processor may be configured to control the receiver to receive from the BS second information on whether an empty symbol is configured between the indicated symbols. The processor may be configured to control the receiver to receive from the BS third information including antenna port indexes of the antenna ports respectively corresponding to the indicated symbols. A symbol located between the indicated symbols may be set to an empty symbol in which no signal is transmitted.

The processor may be configured to control the transmitter to transmit to the BS information on antenna switching capability for the SRS transmission. The information on the antenna switching capability for the SRS transmission may include information on a subcarrier spacing of the UE or information on a transition time period for the antenna switching.

According to embodiments of the present disclosure, it is capable of reducing errors when SRS transmission is performed on consecutive symbols based on antenna switching operation.

The effects that can be achieved through the embodiments of the present disclosure are not limited to what has been particularly described hereinabove and other effects which are not described herein can be derived by those skilled in the art from the following detailed description.

BRIEF DESCRIPTION OF THE DRAWINGS

The accompanying drawings, which are included to provide a further understanding of the disclosure and are incorporated in and constitute a part of this specification, illustrate embodiments of the disclosure.

DETAILED DESCRIPTION

Figure 1:
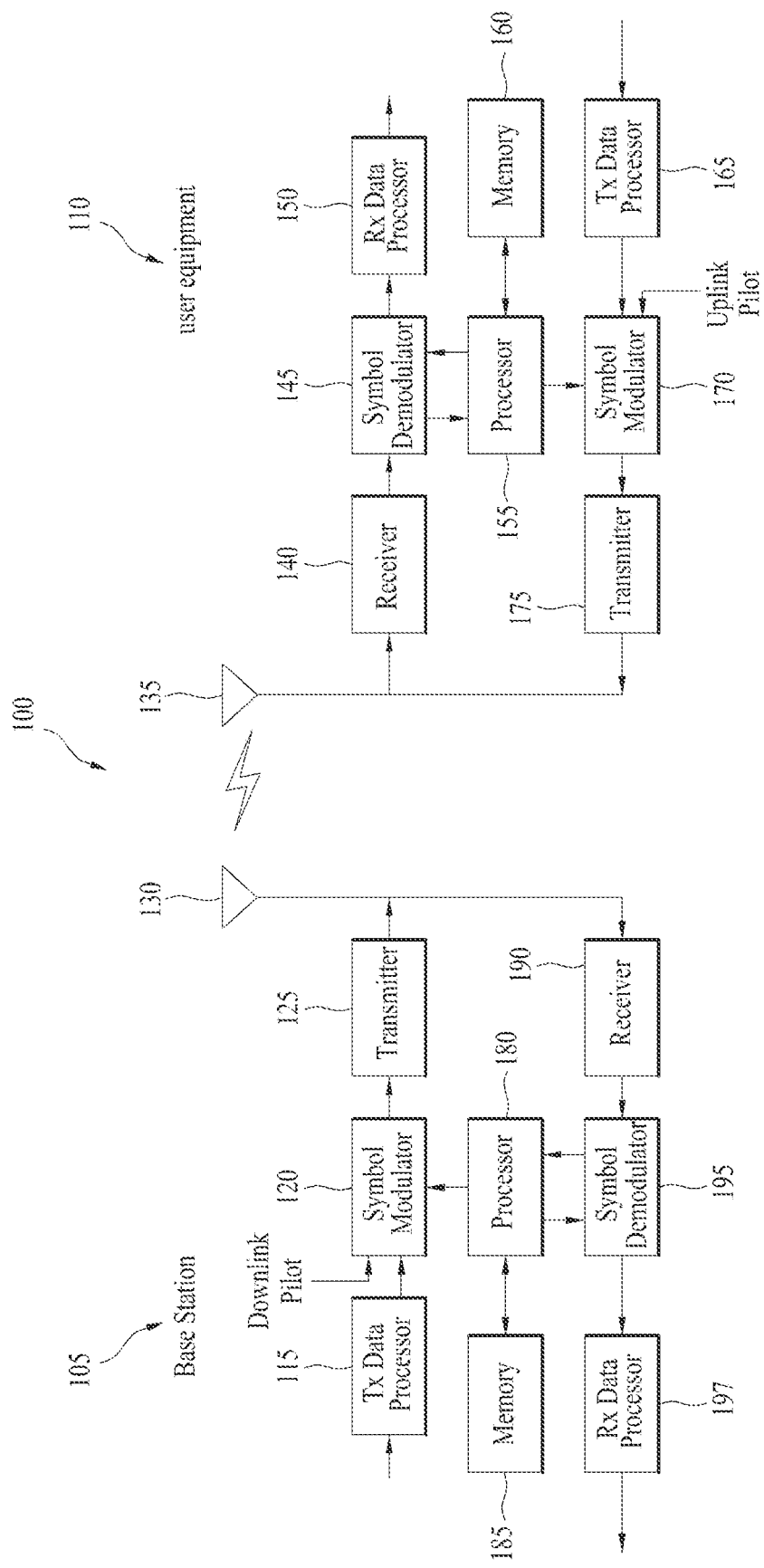
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
  trigger type 0: higher layer signalling
  trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.

TABLE 1-continued

Transmission comb $k_{TC}$, as defined in subclause
5.5.3.2 of [3] tor trigger type 0 and each
configuration of trigger type 1
Starting physical resource block assignment
$n_{RRC}$, as defined in subclause 5.5.3.2 of [3] for
trigger type 0 and each configuration of trigger type 1
duration: single or indefinite (until disabled), as
defined in [11] for trigger type 0
srs-ConfigIndex $I_{SRS}$ for SRS periodicity $T_{SRS}$
and SRS subframe offset $T_{offset}$, as defined
in Table 8.2-1 and Table 8.2-2 for trigger type 0
and SRS periodicity $T_{SRS,1}$, and SRS
subframe offset $T_{SRS,1}$, as defined in Table 8.2-4
and Table 8.2-5 trigger type 1
SRS bandwidth $B_{SRS}$, as defined in subclause
5.5.3.2 of [3] for trigger type 0 and each
configuration of trigger type 1
Frequency hopping bandwidth, $b_{hop}$, as defined
in subclause 5.5.3.2 of [3] for trigger type 0
Cyclic shift $n_{SRS}^{cs}$, as defined in subclause 5.5.3.1
of [3] for trigger type 0 and each
configuration of trigger type 1
Number of antenna ports $N_p$ for trigger type 0 and
each configuration of trigger type 1
For trigger type 1 and DCI format 4 three sets of
SRS parameters, srs-ConfigApDCI-
Format4, are configured by higher layer signalling.
The 2-bit SRS request field [4] in DCI
format 4 indicates the SRS parameter set given
in Table 8.1-1. For trigger type 1 and DCI
format 0, a single set of SRS parameters,
srs-ConfigApDCI-Format0, is configured by higher
layer signalling. For trigger type 1 and DCI formats
1A/2B/2C/2D, a single common set of
SRS parameters, srs-ConfigApDCI-Format1a2b2c,
is configured by higher layer signalling.
The SRS request field is 1 bit [4] for DCI formats
0/1A/2B/2C/2D, with a type 1 SRS
triggered if the value of the SRS request field is set to '1'.
A 1-bit SRS request field shall be included in DCI
formats 0/1A for frame structure type 1
and 0/1A/2B/2C/2D for frame structure type 2 if the
UE is configured with SRS parameters
for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
|---|---|
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers.
The allowable values are given in subclause 5.5.3.2 of [3].
The serving cell specific SRS transmission sub-frames are configured by higher layers. The
allowable values are given in subclause 5.5.3.3 of [3].
For a TDD serving cell, SRS transmissions can occur in UpPTS and uplink subframes of the
UL/DL configuration indicated by the higher layer parameter subframeAssignment for the
serving cell.
When closed-loop UE transmit antenna selection is enabled for a given serving cell for a UE
that supports transmit antenna selection, the index $a(n_{SRS})$, of the UE antenna that transmits
the SRS at time $n_{SRS}$ is given by
$a(n_{SRS}) = n_{SRS}$ mod 2, for both partial and full sounding bandwidth, and when frequency
hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases}, \beta = \begin{cases} 1 & \text{where } k \bmod 4 = 0 \\ 0 & \text{otherwise} \end{cases}$$

when frequency hopping is enabled (i.e. $b_{hop} < B_{SRS}$),
where values $B_{SRS}$, $b_{hop}$, $N_b$, and $n_{SRS}$ are given in subclause 5.5.3.2 of [3], and K =
$\Pi_{b'=b_{hop}}^{B_{SRS}} N_b$ (where $N_{b_{hop}} = 1$ regardless of the $N_b$ value), except when a single SRS
transmission is configured for the UE. If a UE is configured with more than one serving cell,
the UE is not expected to transmit SRS on different antenna ports simultaneously.
A UE may be configured to transmit SRS on Np antenna ports of a serving cell where Np
may be configured by higher layer signalling. For PUSCH transmission mode 1
$N_p \in \{0, 1, 2, 4\}$ and tor PUSCH transmission mode $N_p \in \{0, 1, 2\}$ with two antenna ports
configured for PUSCH and $N_p \in \{0, 1, 4\}$ with 4 antenna ports configured for PUSCH. A UE
configured for SRS transmission on multiple antenna ports of a serving cell shall transmit
SRS for all the configured transmit antenna ports within one SC-FDMA symbol of the same
subframe of the serving cell.
The SRS transmission bandwidth and starting physical resource block assignment are the
same for all the configured antenna ports of a given serving cell.
A UE not configured with multiple TAGs shall not transmit SRS in a symbol whenever SRS
and PUSCH transmissions happen to overlap in the same symbol.
For TDD serving cell, when one SC-FDMA symbol exists in UpPTS of the given serving
cell, it can be used for SRS transmission. When two SC-FDMA symbols exist in UpPTS of
the given serving cell, both can be used for SRS transmission and for trigger type 0 SRS both
can be assigned to the same UE.
If a UE is not configured with multiple TAGs, or if a UE is configured with multiple TAGs
and SRS and PUCCH format 2/2a/2b happen to coincide in the same subframe in the same
serving cell,
The UE shall not transmit type 0 triggered SRS whenever type 0 triggered SRS and
PUCCH format 2/2a/2b transmissions happen to coincide in the same subframe;
The UE shall not transmit type 1 triggered SRS whenever type 1 triggered SRS and
PUCCH format 2a/2b or format 2 with HARQ-ACK transmissions happen to coincide in the
same subframe;

TABLE 3-continued

The UE shall not transmit PUCCH format 2 without HARQ-ACK whenever type 1
triggered SRS and PUCCH format 2 without HARQ-ACK transmissions happen to coincide
in the same subframe.
If a UE is not configured with multiple TAGs, or if a UE is configured with multiple TAGs
and SRS and PUCCH happen to coincide in the same subframe in the same serving cell,
The UE shall not transmit SRS whenever SRS transmission and PUCCH transmission
carrying HARQ-ACK and/or positive SR happen to coincide in the same subframe if the
parameter ackNackSRS-SimultaneousTransmission is FALSE;
For FDD-TDD and primary cell frame structure 1, the UE shall not transmit SRS in a
symbol whenever SRS transmission and PUCCH transmission carrying HARQ-ACK and/or
positive SR using shortened format as defined in subclauses 5.4.1 and 5.4.2A of [3] happen
to overlap in the same symbol if the parameter ackNackSRS-SimultaneousTransmission is
TRUE.
Unless otherwise prohibited, the UE shall transmit SRS whenever SRS transmission and
PUCCH transmission carrying HARQ-ACK and/or positive SR using shortened format as
defined in subclauses 5.4.1 and 5.4.2A of [3] happen to coincide in the same subframe if the
parameter ackNackSRS-SimultaneousTransmission is TRUE.
A UE not configured with multiple TAGs shall not transmit SRS whenever SRS transmission
on any serving cells and PUCCH transmission carrying HARQ-ACK and/or positive SR
using normal PUCCH format as defined in subclauses 5.4.1 and 5.4.2A of [3] happen to
coincide in the same subframe.
In UpPTS, whenever SRS transmission instance overlaps with the PRACH region for
preamble format 4 or exceeds the range of uplink system bandwidth configured in the
serving cell, the UE shall not transmit SRS.
The parameter ackNackSRS-SimultaneousTransmission provided by higher layers
determines if a UE is configured to support the transmission of HARQ-ACK on PUCCH and
SRS in one subframe. If it is configured to support the transmission of HARQ-ACK on
PUCCH and SRS in one subframe, then in the cell specific SRS subframes of the primary
cell UE shall transmit HARQ-ACK and SR using the shortened PUCCH format as defined in
subclauses 5.4.1 and 5.4.2A of [3], where the HARQ-ACK or the SR symbol corresponding
to the SRS location is punctured.
This shortened PUCCH format shall be used in a cell specific SRS subframe of the primary
cell even if the UE does not transmit SRS in that subframe. The cell specific SRS subframes
are defined in subclause 5.5.3.3 of [3]. Otherwise, the UE shall use the normal PUCCH
format 1/1a/1b as defined in subclause 5.4.1 of [3] or normal PUCCH format 3 as defined in
subclause 5.4.2A of [3] for the transmission of HARQ-ACK and SR.
Trigger type 0 SRS configuration of a UE in a serving cell for SRS periodicity, $T_{SRS}$, and
SRS subframe offset, $T_{offset}$, is defined in Table 8.2-1 and Table 8.2-2, for FDD and TDD
serving cell, respectively. The periodicity $T_{SRS}$ of the SRS transmission is serving cell
specific and is selected from the set {2, 5, 10, 20, 40, 80, 160, 320} ms or subframes.
For the SRS periodicity $T_{SRS}$ of 2 ms in TDD serving cell, two SRS resources are configured
in a half frame containing UL subframe(s) of the given serving cell.
Type 0 triggered SRS transmission instances in a given serving cell for TDD serving cell
with $T_{SRS} > 2$ and for FDD serving cell are the subframes satisfying
$(10 \cdot n_f + k_{SRS} - T_{offset}) \bmod T_{SRS} = 0$,, where for FDD $k_{SRS} = \{0, 1, , , , 0\}$ is the subframe index
within the frame, for TDD serving cell $k_{SRS}$ is defined in Table 8.2-3. The SRS transmission
instances for TDD serving cell with $T_{SRS} = 2$ are the subframes satisfying $k_{SRS} - T_{offset}$.
For TDD serving cell, and a UE configured for type 0 triggered SRS transmission in serving
cell c, and the UE configured with the parameter EIMTA-MainConfigServCell-r12 for
serving cell c, if the UE does not detect an UL/DL configuration indication for radio frame m
(as described in section 13.1), the UE shall not transmit trigger type 0 SRS in a subframe of
radio frame m that is indicated by the parameter eimta-HarqReferenceConfig-r12 as a
downlink subframe unless the UE transmits PUSCH in the same subframe.
Trigger type 1 SRS configuration of a UE in a serving cell for SRS periodicity, $T_{SRS,1}$, and
SRS subframe offset, $T_{offset,1}$, is defined in Table 8.2-4 and Table 8.2-5, for FDD and TDD
serving cell, respectively. The periodicity $T_{SRS,1}$ of the SRS transmission is serving cell
specific and is selected from the set {2, 5, 10} ms or subframes.
For the SRS periodicity $T_{SRS,1}$ of 2 ms in TDD serving cell, two SRS resources are
configured in a half frame containing UL subframe(s) of the given serving cell.
A UE configured for type 1 triggered SRS transmission in serving cell c and not configured
with a carrier indicator field shall transmit SRS on serving cell c upon detection of a positive
SRS request in PDCCH/EPDCCH scheduling PUSCH/PDSCH on serving cell c.
A UE configured for type 1 triggered SRS transmission in serving cell c and configured with
a carrier indicator field shall transmit SRS on serving cell c upon detection of a positive SRS
request in PDCCH/EPDCCH scheduling PUSCH/PDSCH with the value of carrier indicator
field corresponding to serving cell c.
A UE configured for type 1 triggered SRS transmission on serving cell c upon detection of a
positive SRS request in subframe n of serving cell c shall commence SRS transmission in the
first subframe satisfying n + k, k ≥ 4 and
$(10 \cdot n_f + k_{SRS} - T_{offset,1}) \bmod T_{SRS,1} = 0$ for TDD serving cell c with $T_{SRS,1} > 2$ and for
FDD serving cell c,
$(k_{SRS} - T_{offset,1}) \bmod 5 = 0$ for TDD serving cell c with $T_{SRS,1} = 2$
where for FDD serving cell c $k_{SRS} = \{0, 1, \ldots, 9\}$ is the subframe index within the frame $n_f$, for
TDD serving cell c $k_{SRS}$ is defined in Table 8.2-3.
A UE configured for type 1 triggered SRS transmission is not expected to receive type 1 SRS
triggering events associated with different values of trigger type 1 SRS transmission
parameters, as configured by higher layer signalling, for the same subframe and the same
serving cell.
For TDD serving cell c, and a UE configured with EIMTA-MainConfigServCell-r12 for a
serving cell c, the UE shall not transmit SRS in a subframe of a radio frame that is indicated TABLE 3-continued by the corresponding eIMTA-UL/DL-configuration as a downlink subframe.
A UE shall not transmit SRS whenever SRS and a PUSCH transmission corresponding to a
Random Access Response Grant or a retransmission of the same transport block as part of
the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

Table 7 shows $k_{SRS}$ for TDD.

TABLE 7

| | subframe index n | | | | | | | | | |
|---|---|---|---|---|---|---|---|---|---|---|
| | | 1 | | | | | | 6 | | |
| | 0 | 1st symbol of UpPTS | 2nd symbol of UpPTS | 2 | 3 | 4 | 5 | 1st symbol of UpPTS | 2nd symbol of UpPTS | 7 8 9 |
| $k_{SRS}$ in case UpPTS length of 2 symbols | 0 | 1 | | 2 | 3 | 4 | 5 | 6 | | 7 8 9 |
| $k_{SRS}$ in case UpPTS length of 1 symbol | 1 | | | 2 | 3 | 4 | | 6 | | 7 8 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |

TABLE 9-continued

| SRS Configuration Index $I_{SRS}$ | SRS Periodicity (ms) | SRS Subframe Offset |
|---|---|---|
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-31 | reserved | reserved |

Analog Beamforming

In the millimeter wave (mmW) system, a short wavelength is used, and thus a plurality of antennas elements can be installed in the same area. In other words, the wavelength in the 30 GHz band is 1 cm, and accordingly a total of 64 (8×8) antenna elements may be installed at intervals of 0.5 lambda (wavelength) in a 2-dimensional array on a 4 by 4 cm panel. Therefore, in the mmW system, multiple antenna elements may be used to increase the beamforming (BF) gain to enhance the coverage or the throughput.

In this case, if each antenna element is provided with a transceiver unit (TXRU) to enable adjustment of transmit power and phase per antenna element, independent beamforming may be performed for each frequency resource. However, installing TXRUs in all the 100 antenna elements is less feasible in terms of cost. Therefore, a method of mapping a plurality of antenna elements to one TXRU and adjusting the direction of a beam using an analog phase shifter has been considered. However, this analog beamforming technique is disadvantageous in that frequency selective beamforming is not allowed because only one beam direction can be created over the full band.

As an intermediate form of digital BF and analog BF, hybrid BF with B TXRUs which are fewer than Q antenna elements may be considered. In the hybrid BF, the number of directions in which beams are allowed to be transmitted at the same time is limited to B or less, though it depends on how the B TXRUs and Q antenna elements are connected.

Figure 2A:
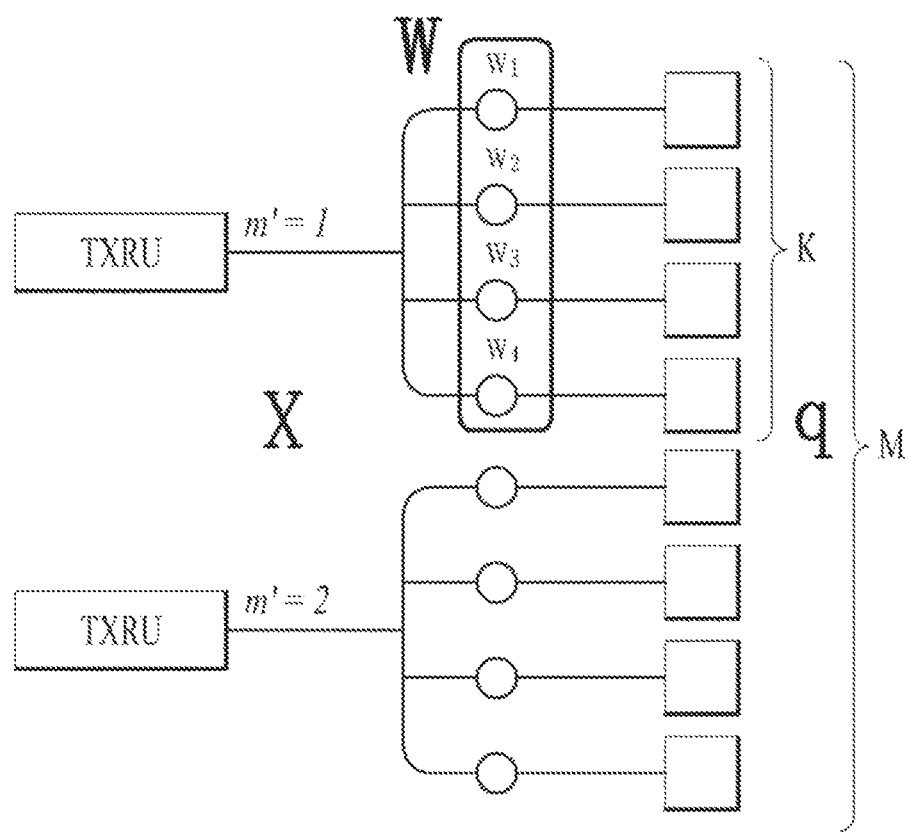
FIG. 2A is a diagram illustrating TXRU virtualization model option 1 (a sub-array model)
Figure 2B:
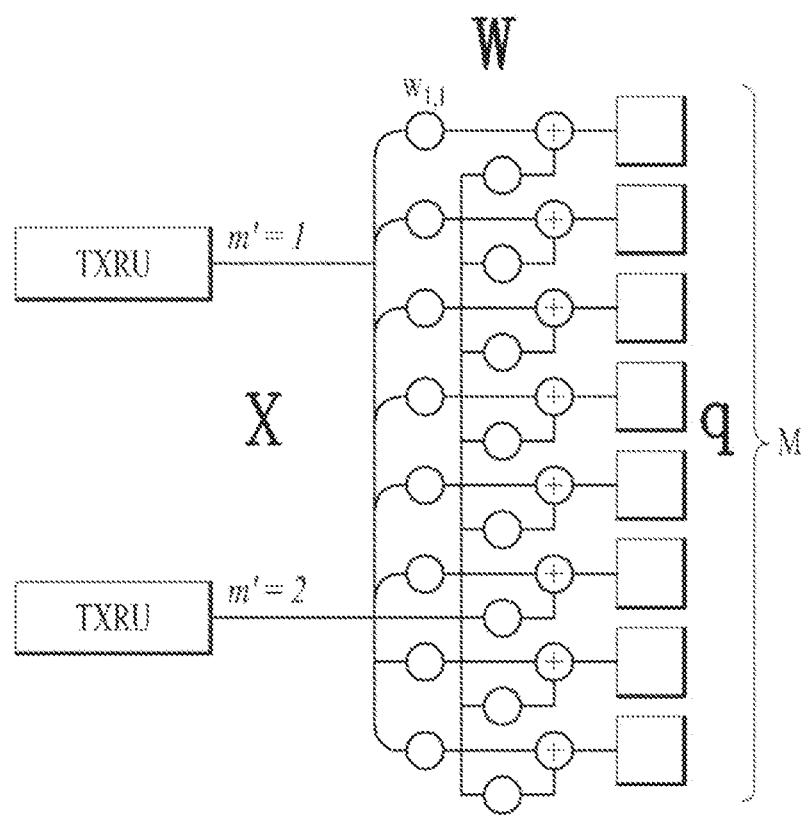
FIG. 2B is a diagram illustrating TXRU virtualization model option 2 (a full connection model).

FIG. 2A is a diagram illustrating TXRU virtualization model option 1 (a sub-array model), and FIG. 2B is a diagram illustrating TXRU virtualization model option 2 (a full connection model).

FIGS. 2A and 2B show representative examples of a method for connection of a TXRU and an antenna element. Here, the TXRU virtualization model shows the relationship between the output signal of the TXRU and the output signal of the antenna elements. FIG. 2A illustrates a scheme in which a TXRU is connected to a sub-array. In this case, the antenna elements are connected to only one TXRU. In contrast, FIG. 2B illustrates a scheme in which a TXRU is connected to all antenna elements. In this case, the antenna elements are connected to all TXRUs. In FIGS. 2A and 2B, W denotes a phase vector multiplied by an analog phase shifter. That is, the direction of analog beamforming is determined by W. Here, the mapping between the CSI-RS antenna ports and the TXRUs may be 1-to-1 or 1-to-many mapping.

Hybrid Beamforming

Figure 3:
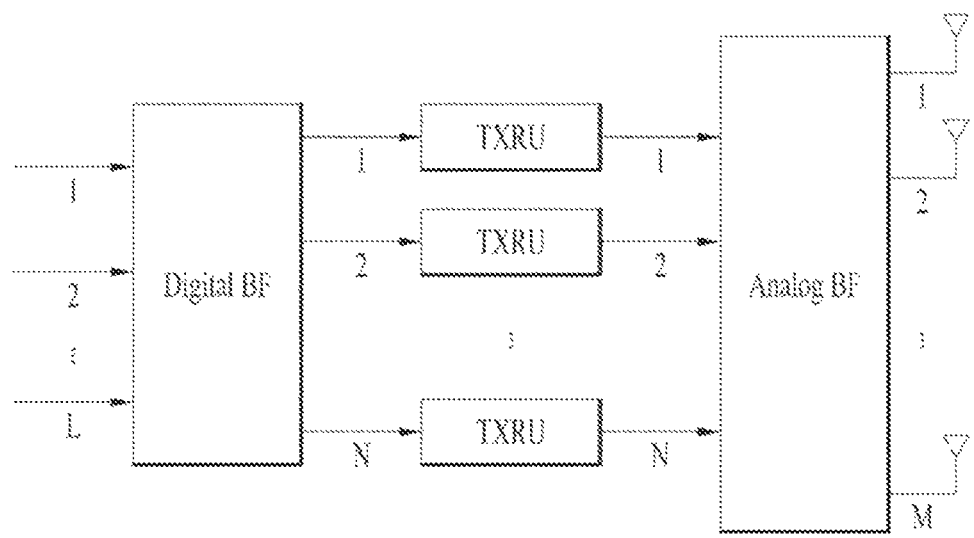
FIG. 3 is a block diagram for hybrid beamforming.

FIG. 3 is a block diagram for hybrid beamforming.

When multiple antennas are used in the New RAT system, a hybrid beamforming technique combining digital beamforming and analog beamforming may be used. In this case, analog beamforming (or RF beamforming) refers to an operation of performing precoding (or combining) in the RF stage. In the hybrid beamforming technique, each of the baseband stage and the RF stage may use precoding (or combining), thereby reducing the number of RF chains and the number of D/A (or a A/D) converters and exhibiting performance close to that of digital beamforming. As shown in FIG. 3, the hybrid beamforming structure may be represented by N transceiver units (TXRU) and M physical antennas for simplicity. Then, the digital beamforming for the L data layers to be transmitted from the transmitting side may be represented by an N by L matrix, and then N converted digital signals are converted into analog signals through the TXRUs and then subjected to analog beamforming represented by an M by N matrix.

FIG. 3 is a schematic diagram of a hybrid beamforming structure in terms of the TXRU and physical antennas. In FIG. 3, the number of digital beams is L, and the number of analog beams is N. Further, in the New RAT system, it is considered to design the base station to change analog beamforming on a symbol-by-symbol basis to support more efficient beamforming for a UE located in a specific area. Further, when N TXRUs and M RF antennas are defined as one antenna panel in FIG. 3, the New RAT system may introduce a plurality of antenna panels to which independent hybrid beamforming is applicable.

When a BS utilizes a plurality of analog beams, an analog beam which is advantageous for signal reception may differ among the UEs, and therefore a beam sweeping operation in which the BS changes a plurality of analog beams to be applied in a specific subframe (SF) on a symbol-by-symbol basis to allow all UEs to have a reception occasion may be considered.

Figure 4:
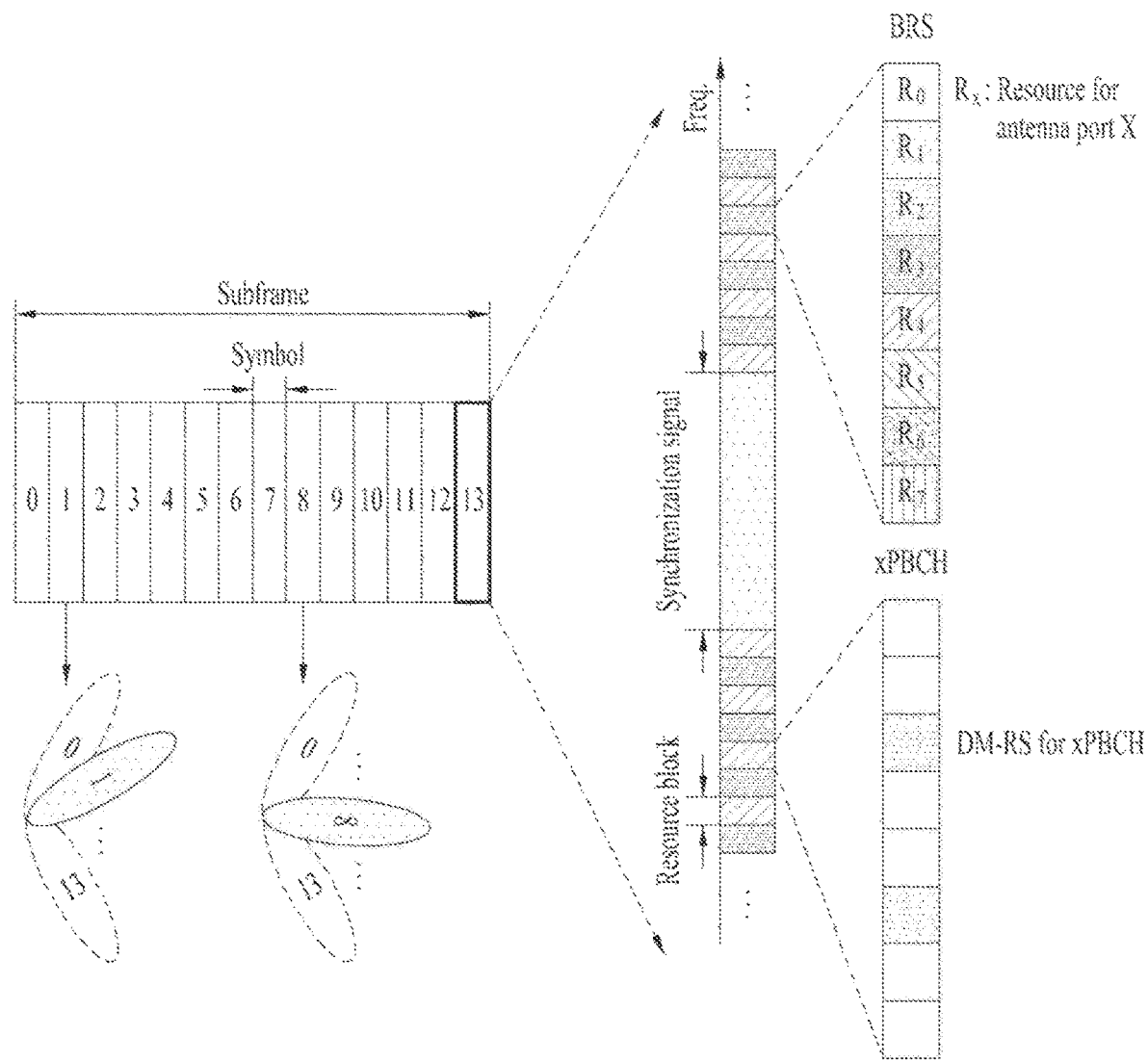
FIG. 4 is a diagram illustrating an example of beams mapped to BRS symbols in hybrid beamforming.

FIG. 4 is a diagram illustrating an example of beams mapped to BRS symbols in hybrid beamforming.

FIG. 4 illustrates the beam sweeping operation for a synchronization signal and system information in a downlink (DL) transmission process. In FIG. 4, a physical resource (or physical channel) on which the system information of the New RAT system is transmitted in a broadcast manner is referred to as a xPBCH (physical broadcast channel). Analog beams belonging to different antenna panels within one symbol may be transmitted simultaneously, and introduction of a beam RS (BRS) may be considered. the BRS is a reference signal (RS) transmitted by applying a single analog beam (corresponding to a specific antenna panel) as shown in FIG. 4 to measure a channel for each analog beam. The BRS may be defined for a plurality of antenna ports, and each antenna port of the BRS may correspond to a single analog beam. While the RS used to measure a beam is referred to as BRS in FIG. 4, it may be called by another name. In this case, unlike the BRS, the synchronization signal or the xPBCH may be transmitted by applying all analog beams in an analog beam group such that any UE can receive the synchronization signal or the xPBCH well.

Figure 5:
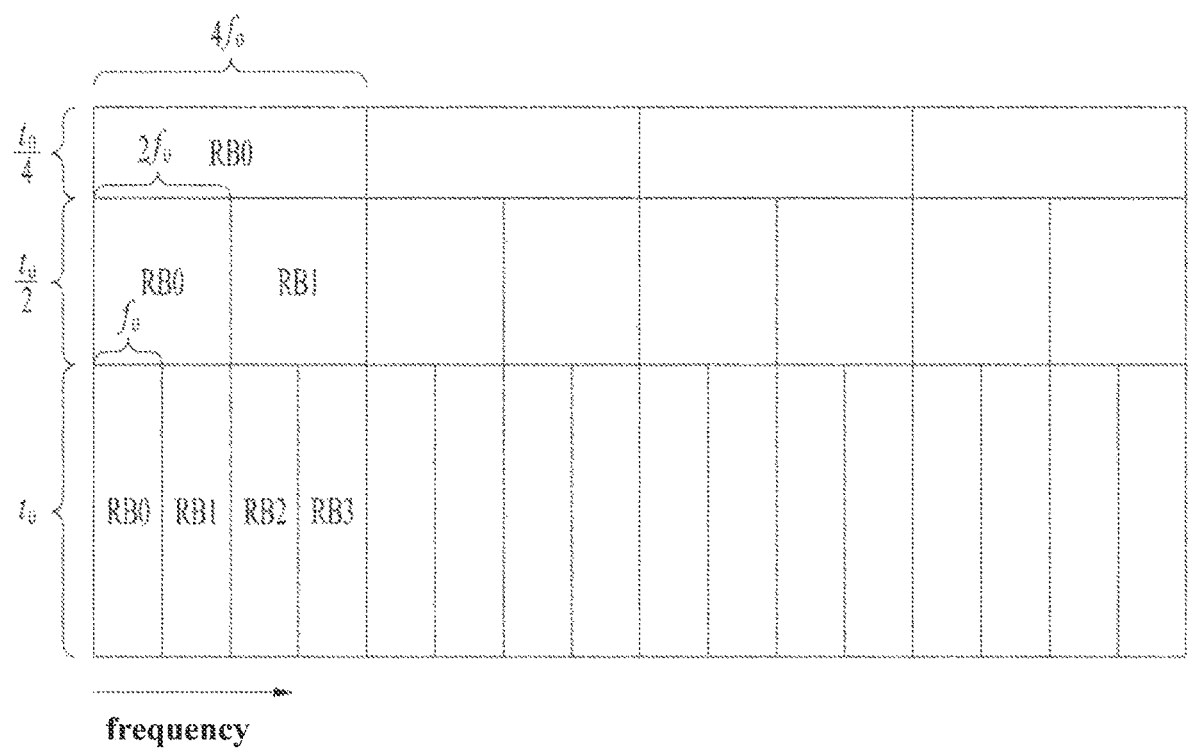
FIG. 5 is an exemplary diagram illustrating symbol/sub-symbol alignment between different numerologies.

FIG. 5 is an exemplary diagram illustrating symbol/sub-symbol alignment between different numerologies.

Features of New RAT (NR) Numerology

In the NR system, a method of supporting scalable numerology is considered. In other words, NR subcarrier spacing is expressed as (2n×15) kHz, where n is an integer. From the nested perspective, the above-mentioned subset or a superset (at least 15, 30, 60, 120, 240, and 480 kHz) is considered as the main subcarrier spacing. Symbol or sub-symbol alignment between different numerologies is supported by adjusting the numerologies to have the same CP overhead rate.

Also, numerology is determined in a structure in which the above-described time/frequency granularity is dynamically allocated according to the respective services (eMBB, URLLC, mMTC) and scenarios (high speed, etc.).

The main agreements made in the NR are summarized as follows.

The maximum bandwidth allocated per NR carrier is 400 MHz.

Details of up to 100 MHz bandwidth are specified in Rel-15.

The scalable numerology is adopted. That is, 15 kHz*($2^n$) (15 to 480 kHz) is used.

One numerology has one subcarrier spacing (SCS) and one cyclic prefix (CP). Each SCS and CP are configured by RRC.

A subframe has a fixed length of 1 ms (a transmission time interval (TTI) is a unit of a slot (14 symbols), a mini-slot (in the case of URLLC), or a multi-slot depending on the SCS or purpose (e.g., URLLC), and the TTI is also configured by RRC signaling (one TTI duration determines how transmission is made on physical layer).

All numerologies are aligned every 1 ms.

The number of subcarriers in each RB is fixed to 12.

The number of symbols in a slot is 7 or 14 (in the case of an SCS lower than 60 kHz) and 14 (in the case of an SCS higher than 60 kHz).

Tables 10 and 11 show a sequence generation method using a cell ID and a root value in the LTE system.

TABLE 10

The sequence-group number u in slot $n_s$ is defined by a group hopping pattern $f_{gh}(n_s)$ and a sequence-shift pattern $f_{ss}$ according to
$u = (f_{gh}(n_s) + f_{ss})\mod 30$
There are 17 different hopping patterns and 30 different sequence-shift patterns. Sequence-group hopping can be enabled or disabled by means of the cell-specific parameter Group-hopping-enabled provided by higher layers. Sequence-group hopping for PUSCH can be disabled for a certain UE through the higher-layer parameter Disable-sequence-group-hopping despite being enabled on a cell basis unless the PUSCH transmission corresponds to a Random Access Response Grant or a retransmission of the same transport block as part of the contention based random access procedure.
The group-hopping pattern $f_{gh}(n_s)$ may be different for PUSCH, PUCCH and SRS and is given by $$f_{gh}(n_s) = \begin{cases} 0 & \text{if group hopping is disabled} \\ \left(\sum_{i=0}^{7} c(8n_s + i) \cdot 2^i\right)\mod 30 & \text{if group hopping is enbled} \end{cases}$$

where the pseudo-random sequence c(i) is defined by clause 7.2. The pseudo-random sequence generator shall be initialized with $c_{init} = \left\lfloor \frac{n_{ID}^{RS}}{30} \right\rfloor$ at the beginning of each radio frame where $n_{ID}^{RS}$ is given by clause 5.5.1.5.
The sequence-shift pattern $f_{ss}$ definition differs between PUCCH, PUSCH and SRS.
For SRS, the sequence-shift pattern $f_{ss}^{SRS}$ is given by $f_{ss}^{SRS} = n_{ID}^{RS} \mod 30$ where $n_{ID}^{RS}$ is given by clause 5.5.1.5.

TABLE 11

Sequence hopping only applies for reference-signals of length $M_{sc}^{RS} \geq 6N_{sc}^{RB}$.
For reference-signals of length $M_{sc}^{RS} < 6N_{sc}^{RB}$, the base sequence number v within the base sequence group is given by v = 0.
For reference-signals of length $M_{sc}^{RS} \geq 6N_{sc}^{RB}$, the base sequence number v within the base sequence group in slot $n_s$ is defined by $$v = \begin{cases} c(n_s) & \text{if group hopping is disabled and sequence hopping is enabled} \\ 0 & \text{otherwise} \end{cases}$$

where the pseudo-random sequence c(i) is given by clause 7.2. The parameter Sequence-hopping-enabled provided by higher layers determines if sequence hopping is enabled or not. Sequence hopping for PUSCH can be disabled for a certain UE through the higher-layer parameter
Disable-sequence-group-hopping despite being enabled on a cell basis unless the PUSCH transmission corresponds to a Random Access Response Grant or a retransmission of the same transport block as part of the contention based random access procedure.
For SRS, the pseudo-random sequence generator shall be initialized with $$c_{init} = \left\lfloor \frac{n_{ID}^{RS}}{30} \right\rfloor \cdot 2^5 + \left(n_{ID}^{RS} + \Delta_{ss}\right)\mod 30 \text{ at the beginning of each radio frame where } n_{ID}^{RES} \text{ is}$$

given by clause 5.5.1.5 and $\Delta_{ss}$ is given by clause 5.5.1.3.
Sounding reference signals: $n_{ID}^{RS} = N_{ID}^{cell}$.

$$x_q(m) = e^{-j\frac{\pi q m(m+1)}{N_{ZC}^{RS}}}, 0 \leq m \leq N_{ZC}^{RS} - 1$$

TABLE 11-continued with q given by $q = \lfloor \bar{q} + 1/2 \rfloor + v \cdot (-1)^{\lfloor 2\bar{q} \rfloor}$
$\bar{q} = N_{ZC}^{RS} \cdot (u+1)/31$ The characteristics of SRS hopping in the LTE system are summarized as follows.

- SRS hopping is performed only in the case of periodic SRS triggering (i.e., triggering type 0).
- SRS resource allocation is given by a predefined hopping pattern.
- A hopping pattern may be UE-specifically configured (designated) through RRC signaling (however, overlapping is not allowed).
- The SRS, in a frequency domain, may be hopped by applying a hopping pattern to each subframe where a cell/UE-specific SRS is transmitted.
- The SRS frequency-domain starting location and hopping formular are defined by Equation 1.

[Equation 1]

$$k_0^{(p)} = \bar{k}_0^{(p)} + \sum_{b=0}^{B_{SRS}} K_{TC} M_{sc,b}^{RS} n_b$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases}$$

$$n_{SRS} = \begin{cases} 2N_{SP} n_f + 2(N_{SP}-1)\lfloor \dfrac{n_s}{10} \rfloor + \lfloor \dfrac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

In Equation 1, $n_{SRS}$ denotes a hopping interval in the time domain, and $N_b$ denotes the number of branches allocated to a tree level b, where b may be determined by setting (configuring) $B_{SRS}$ in dedicated RRC.

Figure 6:
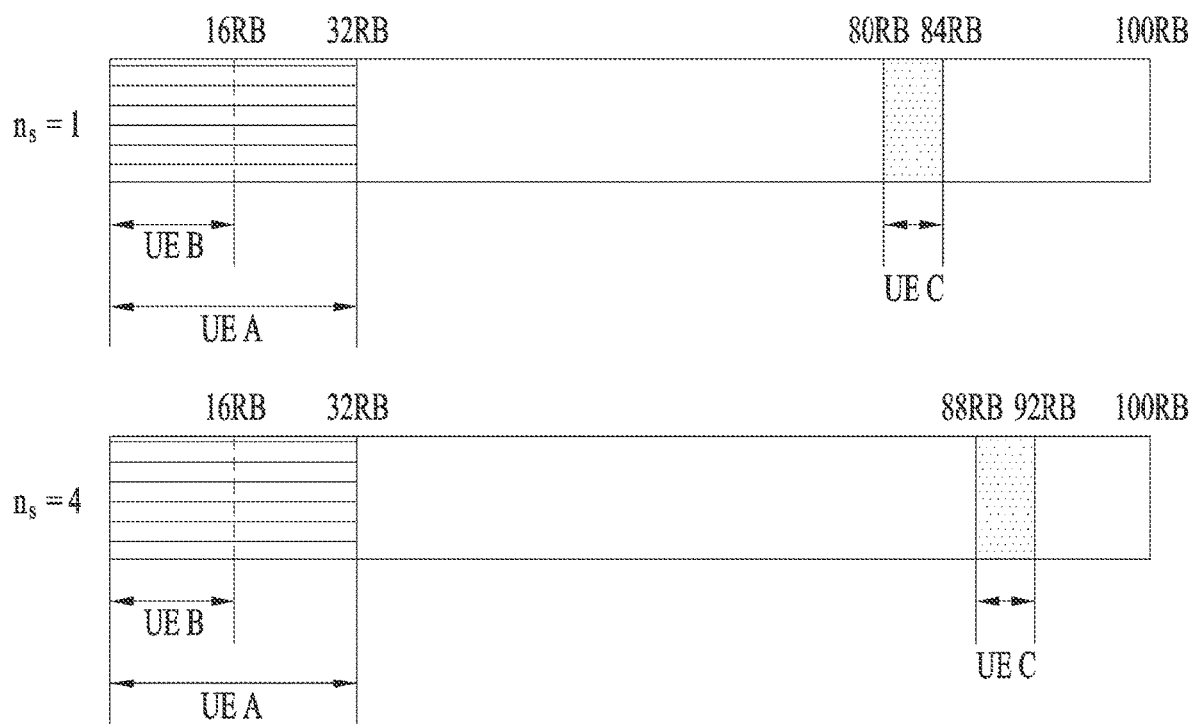
FIG. 6 is a diagram illustrating an LTE hopping pattern ($n_s=1 \rightarrow n_s=4$).

FIG. 6 is a diagram illustrating an LTE hopping pattern ($n_s=1 \rightarrow n_s=4$).

Hereinafter, an example of configuring an LTE hopping pattern will be described

An LTE hopping pattern parameter may be set by cell-specific RRC signaling. For example, some parameters may be configured as follows: $C_{SRS}=1$, $N_{RB}^{UL}=100$, $n_f=1$, $n_s=1$.

In addition, the LTE hopping pattern parameter may also be set through UE-specific RRC signaling. For example, some parameters may be configured as follows:

UE A: $B_{SRS}=1$, $b_{hop}=0$, $n_{RRC}=22$, $T_{SRS}=10$
UE B: $B_{SRS}=2$, $b_{hop}=0$, $n_{RRC}=10$, $T_{SRS}=5$
UE C: $B_{SRS}=3$, $b_{hop}=2$, $n_{RRC}=23$, $T_{SRS}=2$.

SRS Antenna Selection in LTE System

It is defined in the LTE system that an antenna is selected according to each SRS transmission slot in the case of 2Tx.

TABLE 12

$a(n_{SRS}) = n_{SRS} \bmod 2$, for both partial and full sounding bandwidth, and when frequency hopping is disabled (i.e., $b_{hop} \geq B_{SRS}$), $a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases}$

TABLE 12-continued $K = \prod_{b'=b_{hop}}^{B_{SRS}} N_{b'}$ (where $N_{b_{hop}} = 1$ regardless of the $N_b$ enabled (i.e., $b_{hop} < B_{SRS}$),
where values $B_{SRS}$, $b_{hop}$, Nb and $n_{SRS}$ are given in subclause 5.5.3.2 of [3], and $K = \prod_{b'=b_{hop}}^{B_{SRS}} N_{b'}$ (where $N_{b_{hop}} = 1$ regardless of the $N_b$ value), except when a single SRS transmission is configured for the UE.

When a UE is configured with two or more serving cells, the UE does not expect that it is capable of transmitting the SRS on different antenna ports simultaneously. In the case of frequency hopping operation, antenna selection may be determined depending on the location at which SRS resources are allocated (for example, K=even number). Table 13 below shows an example.

TABLE 13

$a(n_{SRS}) = n_{SRS} \bmod 4$ $a(n_{SRS}) = \begin{cases} (n_{SRS} + \gamma \lfloor n_{SRS}/4 \rfloor + \beta \cdot \lfloor n_{SRS}/K \rfloor) \bmod 4 & \text{when } K \text{ is even} \\ n_{SRS} \bmod 4 & \text{when } K \text{ is odd} \end{cases}$ K is defined as the minim number of SRS transmissions required to cover the total UL BW using the SRS $\beta = \begin{cases} 1 & \text{when } K \bmod M = 0, \text{ where } M = 6, 8, 10 \text{ or } 18 \\ 0 & \text{otherwise} \end{cases}$ $\gamma = \begin{cases} 1 & \text{when } K \bmod N = 0, \text{ where } N = 6, 10 \text{ or } 18 \\ 0 & \text{otherwise} \end{cases}$ Table 14 below shows an example of antenna selection based on SRS frequency hopping (K=4).

TABLE 14

| $n_{SRS}$ | First part of SRS bandwidth | Second part of SRS bandwidth | Third part of SRS bandwidth | Fourth part of SRS bandwidth |
|---|---|---|---|---|
| 0 | Antenna index 0 | | | |
| 1 | | Antenna index 1 | | |
| 2 | | | Antenna index 2 | |
| 3 | | | | Antenna index 3 |
| 4 | Antenna index 1 | | | |
| 5 | | Antenna index 2 | | |
| 6 | | | Antenna index 3 | |
| 7 | | | | Antenna index 0 |
| 8 | Antenna index 2 | | | |
| 9 | | Antenna index 3 | | |
| 10 | | | Antenna index 0 | |
| 11 | | | | Antenna index 1 |
| 12 | Antenna index 3 | | | |
| 13 | | Antenna index 0 | | |
| 14 | | | Antenna index 1 | |
| 15 | | | | Antenna index 2 |

In the case of an uplink SRS port, antenna switching may be required depending on UE RF capability if sounding is necessary. In this case, depending on a specific numerology, if a transition time during which the power level changes due to antenna switching is within a CP, there is no problem. However, if the transition time is out of the CP and SRS transmission is performed on consecutive symbols, an error may occur during sounding. To solve the above problem, the present disclosure proposes a method of transmitting an SRS in symbols, mini-slots, or slots.

Effects of Transition Time of Antenna Switching

Figures 7A, 7B:
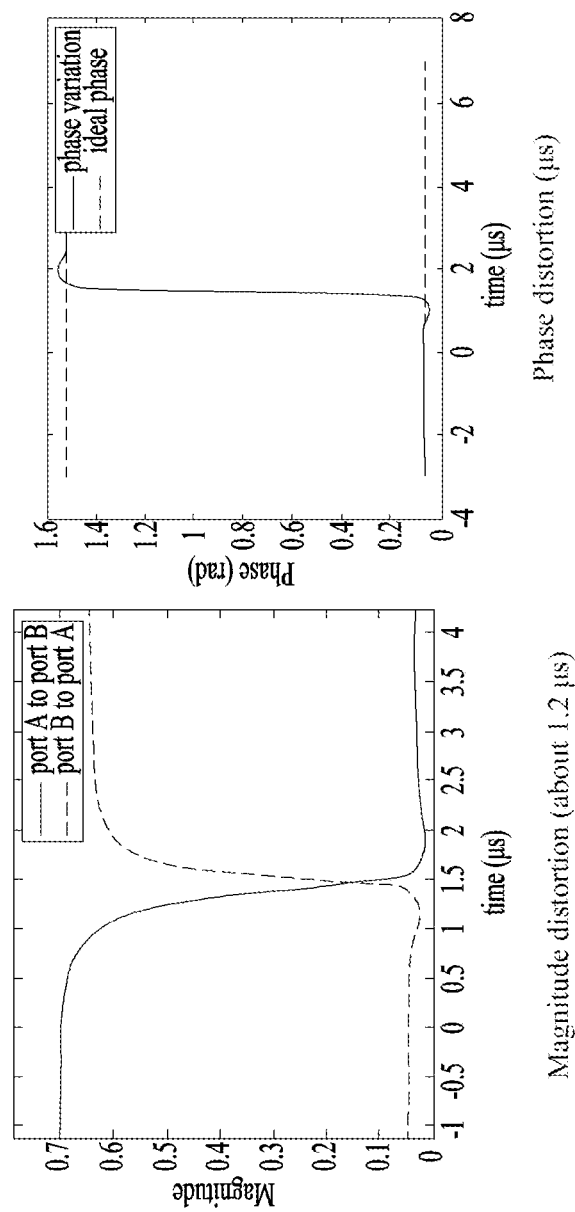
FIGS. 7A and 7B are diagrams illustrating distortions caused by antenna switching.

FIGS. 7A and 7B are diagrams illustrating distortions caused by antenna switching.

FIG. 7A shows a magnitude distortion, and FIG. 7B shows a phase distortion.

The signal distortion phenomenon during RF switching was researched using a wireless open-access research platform (WARP) FPGA board (by Rice University and Mango Communications). The target band was 2.4 GHz, and the transition time was represented by the period taken from 90% of the magnitude of port A to 90% of the magnitude of port B when switching from port A to port B. The transition time was estimated at about 1.2 us, and the performance was degraded by the signal distortions.

Figure 8:
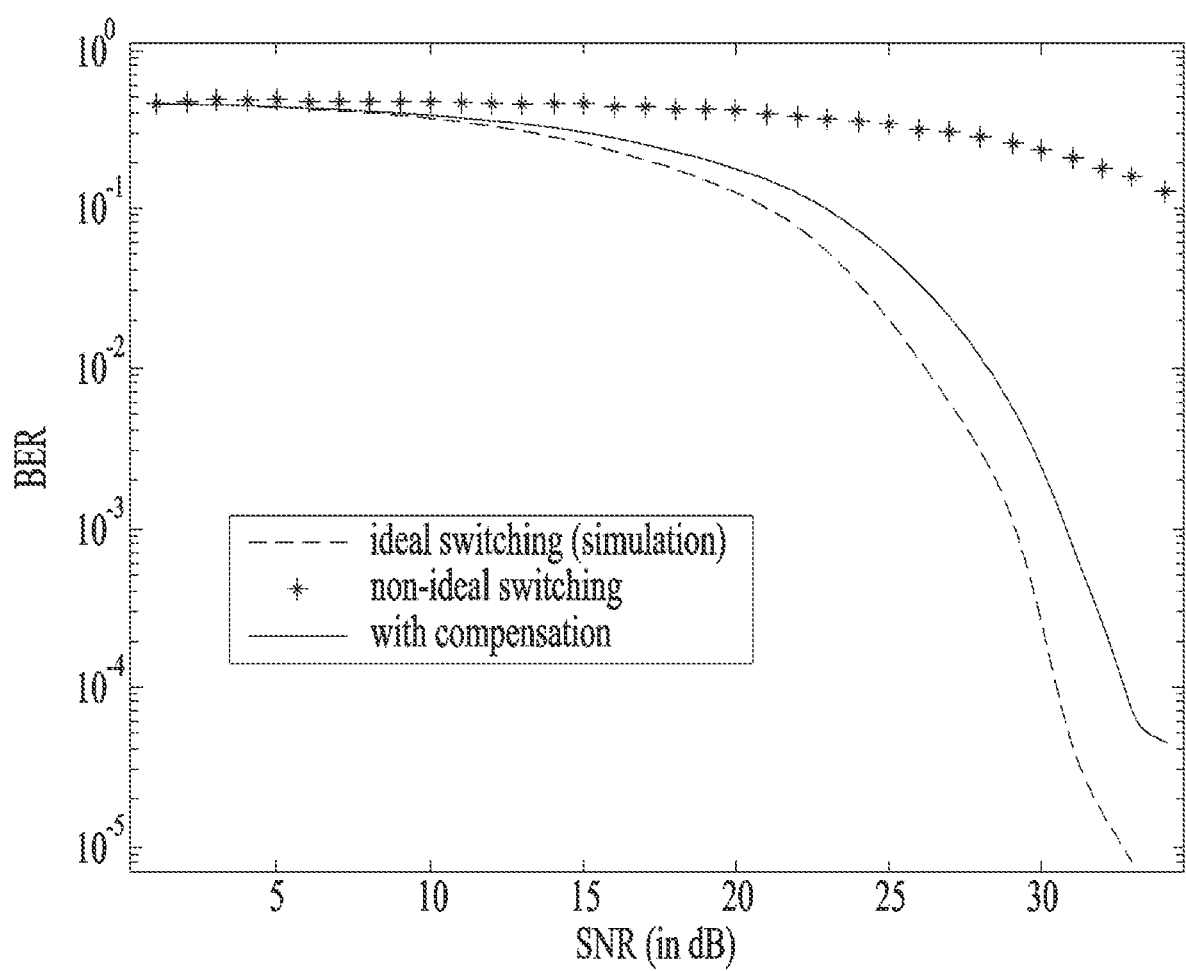
FIG. 8 is a diagram illustrating performance degradation caused by antenna switching.

FIG. 8 is a diagram illustrating performance degradation caused by antenna switching.

Generally, the transition time depending on antenna switching is estimated at about 5 us. Referring to Table 15 below, in the case of the 15 kHz SCS of the LTE system, the CP length is determined as about 4.6875 us. In addition, considering that the last symbol of a subframe is allocated as an SRS transmission resource, it may be known that no consecutive symbols are allocated as the SRS transmission resource. In the LTE system, since the transition time is within the CP even if antenna switching is applied between symbols, no impairment is considered regarding antenna switching for SRS transmission.

In the NR system, the SRS transmission is configured on or across multiple symbols (1, 2, or 4 symbols), and the numerology is a multiple of 15 kHz. In a system with a numerology above 15 kHz, if the SRS transmission is configured across consecutive symbols and in SRS transmission, there may be a distortion in an SRS symbol based on antenna switching, and accordingly, an error may occur for UL beam management or UL/DL CSI acquisition. Thus, such UEs need to perform the SRS transmission depending on their RF switching capabilities.

The present disclosure describes a method of reporting UEs' RF capabilities and configuring SRS transmission based thereon. It is assumed in the present disclosure that the NR supports not only antenna switching for SRS transmission on one carrier but also at least 2Tx switching or 4Tx switching. In this specification, the term "antenna" may be referred to as "antenna port", "port", etc.

Proposal 1

A BS may allow a UE capable of performing antenna switching for SRS transmission to transmit an SRS in or over a plurality of symbols. That is, when the BS sets an n-th symbol as a symbol for the SRS transmission for the UE performing SRS switching (i.e., the antenna switching for the SRS transmission), the BS may empty an (n+1)-th symbol, which corresponds to the next symbol of the n-th symbol, or a next sub-symbol and set or allocate an (n+2)-th symbol, which corresponds to the second next symbol, or a second next sub-symbol as the symbol for the SRS transmission (the sub-symbol refers to a symbol smaller than a reference symbol, which is generated by a change in the numerology). The above configuration or allocation made by the BS is basically UE-specific.

Figure 9A:
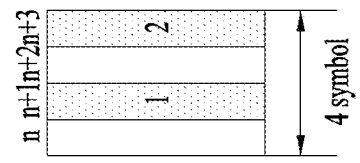
FIGS. 9A and 9B are diagrams illustrating an example of providing an SRS symbol index for antenna switching for SRS transmission.
Figure 9B:
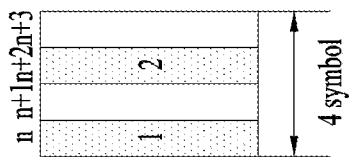

FIGS. 9A and 9B are diagrams illustrating an example of providing an SRS symbol index for antenna switching for SRS transmission.

The BS may provide the UE with the index of a symbol to which the SRS is allocated among multiple symbols. For example, when the BS configures four SRS symbols starting from the n-th symbol, the BS may transmit information indicating that the indexes of symbols for the SRS transmission are n and n+2 to the UE supporting the antenna switching for the SRS transmission as shown in FIG. 9A. In contrast, the BS may transmit information indicating that the indexes of the symbols for the SRS transmission are n+1 and n+3 to the UE as shown in FIG. 9B.

In addition, the BS may provide the UE with a flag indicating whether a symbol is empty due to the antenna switching for the SRS transmission.

Moreover, the BS may inform the UE of symbols to which the SRS is allocated in the form of a bitmap. Accordingly, the UE may recognize the allocated SRS symbols based on the bitmap. For example, when the BS transmits a bitmap of '1010', the UE may recognize that among four SRS symbols, the first and third symbols in the time domain are allocated for the SRS transmission.

Proposal 1-1

As a more specific proposal of Proposal 1, even though SRS transmission is configured over multiple symbols, a BS may determine whether to empty a symbol(s) between allocated or indicated SRS symbols depending on the numerology or UE RF switching capability. The BS may provide the UE with information indicating whether the symbol between the SRS symbols is empty, that is, no data is loaded therein. The BS may provide the above information to the UE through RRC signaling (Layer 3 signaling), medium access control channel element (MAC CE) signaling (Layer 2 signaling), DCI signaling (Layer 1 signaling), etc.

For example, if the UE has a transition time of 4 us due to RF antenna switching and is configured with a numerology corresponding to an SCS of 30 kHz, the BS may enable a configuration flag for emptying the symbol between the SRS symbols allocated to the UE and inform the UE that the configuration flag is enabled. As another example, if the UE has a transition time of 4 us due to RF antenna switching and is configured with a numerology corresponding to an SCS of 15 kHz, the BS may disable the configuration flag for emptying the symbol between the SRS symbols allocated to the UE and inform the UE that the configuration flag is disabled.

Proposal 2

A BS may provide information on ports (or antenna ports) mapped to allocated SRS symbols to a UE performing antenna switching for SRS transmission. Herein, a port or antenna port for SRS transmission may be referred to as an SRS port.

An SRS port value (index) may be implicitly determined, or the UE may obtain the SRS port value (index) in an implicit manner. For example, the mapped port may be determined based on the SRS symbol index. The port may be determined by the index of a slot/mini-slot in which the SRS is configured. For example, SRS port 1 may be mapped to a symbol n, and SRS port 2 may be mapped to a symbol (n+1).

Figure 10:
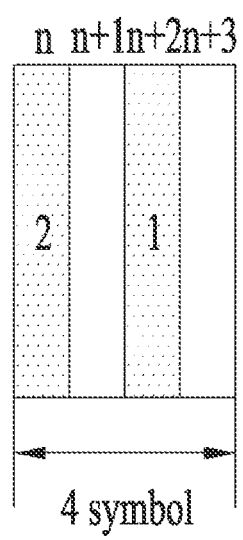
FIG. 10 is a diagram illustrating antenna switching for SRS transmission based on a predetermined SRS port order.

FIG. 10 is a diagram illustrating antenna switching for SRS transmission based on a predetermined SRS port order.

An SRS port(s) may be mapped to respective SRS symbol(s) based on the predetermined order, which is configured by RRC, etc. For example, when the number of ports mapped to one symbol is 1 and a number of SRS ports is two, and a number of SRS symbols is four, if the port indexes are determined as shown in Table 15, this may be represented as shown in FIG. 10.

When four SRS symbols are configured as shown in FIG. 10, if a UE performs antenna switching operation for SRS transmission, a BS may need to allocate the SRS to the first and third symbols among the four symbols and empty the second and fourth symbols.

Table 15 shows an SRS port mapping order based on the number of configured SRS ports in the case of the antenna switching for the SRS transmission.

TABLE 15

|  | SRS port number = 2 | SRS port number = 4 |
|---|---|---|
| SRS port mapping order based on SRS switching | {2, 1} | {1, 3, 2, 4} |

The BS may transmit the value (index) of the SRS port mapped to the SRS symbol explicitly through DCI, RRC signaling, MAC CE signaling, etc. SRS mapping rules for mapping the SRS to SRS symbol(s) may be configured by higher layers, and the BS may transmit information about the SRS mapping rules to the UE through higher layer signaling. After selectin one of the SRS mapping rules, the BS may inform the UE of the selected mapping rule through DCI.

Table 16 shows SRS port mapping order configurations and mapping orders based on the number of SRS ports in the case of the antenna switching for the SRS transmission.

TABLE 16

| SRS port mapping order configuration based on antenna switching for SRS transmission | SRS port number = 2 | SRS port number = 4 |
|---|---|---|
| 0 | {2, 1} | {1, 3, 2, 4} |
| 1 | {2, 1} | {2, 3, 4, 1} |
| 2 | {1, 2} | {1, 2, 3, 4} |
| 3 | {1, 2,} | {4, 3, 2, 1} |

For example, when the index of the SRS port mapping order configuration based on the antenna switching for the SRS transmission is '1' and the number of SRS ports is 2 in Table 16, the port numbers of SRS ports sequentially mapped to SRS symbols in the time domain are 2 and 1 (in this case, a number of SRS symbols is four, but the SRS is allocated to the first and third symbols for antenna switching operation).

In the case of the antenna switching for the SRS transmission, the BS may provide information on SRS transmission resources in an SRS symbol to the UE and information on SRS ports mapped to respective SRS transmission resource(s). Due to the switching, allocatable ports may be mapped to the allocated SRS transmission resources when the SRS resources are configured. For example, when SRS port numbers (SRS port values, SRS port indexes, etc.) are 1, 2, 3, and 4, ports 1 and 3 may be simultaneously transmitted, and ports 2 and 4 may be simultaneously transmitted. The UE may not simultaneously transmit SRSs on ports between the two port pairs ({1,3} and {2,4}) (for example, ports 1 and 2) based on antenna switching. If an SRS symbol includes two SRS transmission resources, each SRS port respectively mapped to each SRS transmission resource may be port 1 and/or port 3. In this case, if port 1 or port 3 is mapped to one SRS transmission resource in one SRS symbol, the other SRS resource may not be used for port 2 or port 4.

Table 17 shows an SRS port mapping order based on antenna switching when the number of SRS symbols is 4.

TABLE 17

| SRS port mapping order configuration based on antenna switching for SRS transmission | SRS port number = 2 | SRS port number = 4 |
|---|---|---|
| 0 | {2, 1} | {{1, 3}, {2, 4}} |
| 1 | {2, 1} | {{2, 3}, {1, 4}} |
| 2 | {1, 2} | {{1, 2}, {3, 4}} |
| 3 | {1, 2,} | {{1, 4}, {2, 3}} |

Figure 11A:
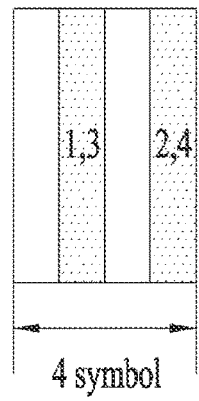
FIGS. 11A and 11B are diagrams illustrating SRS resource configurations and SRS port mapping rules based on antenna switching for SRS transmission.
Figure 11B:
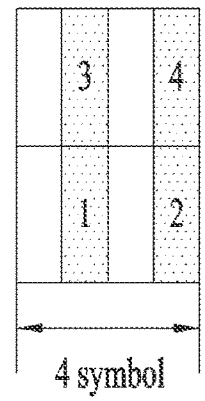

FIGS. 11A and 11B are diagrams illustrating SRS resource configurations and SRS port mapping rules based on antenna switching for SRS transmission.

The numeral shown in FIGS. 11A and 11B corresponds to an SRS port number.

For example, when the number of SRS transmission resources in one SRS symbol is 2, the SRS port mapping order configuration based on the antenna switching for the SRS transmission in Table 17 is '0', the number of SRS ports is 4, and four SRS symbols are configured, the BS may allocate the SRS to the second and fourth symbols as shown in FIG. 11A.

As another example, when the number of SRS transmission resources in one SRS symbol is 4, the SRS port mapping order configuration based on the antenna switching for the SRS transmission in Table 17 is '0', the number of SRS ports is 4, and four SRS symbols are configured, the BS may allocate the SRS to the second and fourth symbols as shown in FIG. 11B.

For example, when a UE requires the antenna switching operation for the SRS transmission, if the number of SRS ports mapped to one symbol is 1 and sounding is required for four ports, K=8 (four SRS allocation symbols+four empty symbols) (that is, the antenna switching is performed four times). The number of symbols required for SRS port mapping based on the antenna switching for the SRS transmission, K is more than the number of SRS symbols allocated to one slot, N (K>N), the port mapping may be performed as follows.

Figure 12:
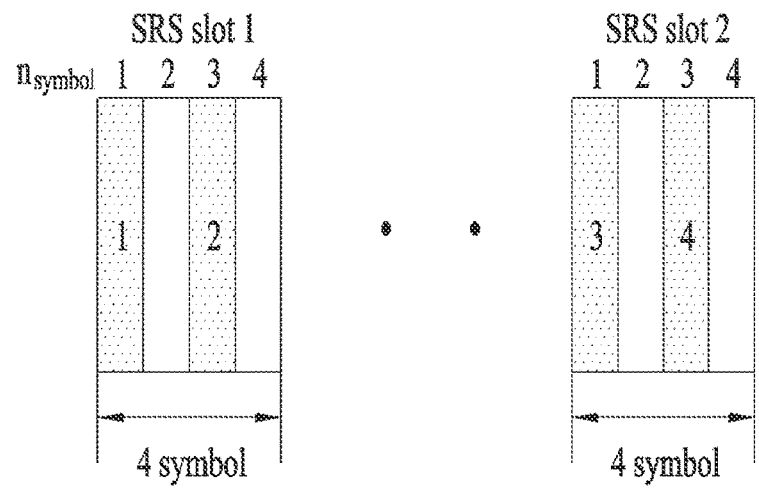
FIG. 12 is a diagram illustrating SRS port to SRS symbol mapping in consideration of antenna switching across consecutive SRS slots (e.g., SRS slot 1, SRS slot 2, etc.).

FIG. 12 is a diagram illustrating SRS port to SRS symbol mapping in consideration of antenna switching across consecutive SRS slots (for example, SRS slot 1, SRS slot 2, etc.).

The number of an SRS port mapped to respectively SRS symbol is implicitly determined. The SRS port value may be implicitly determined based on a symbol index and/or a slot index in which the SRS is configured. For example, the implicit determination may be made according to Equation 2 below.

$$p_{SRS} = \left(\left\lfloor \frac{n_s}{T_{SRS}} \right\rfloor \times N_{SRS\_sym} + \left\lfloor \frac{n_{symbol}}{2} \right\rfloor\right) \bmod 4 \quad \text{[Equation 2]}$$

In Equation 2, $T_{SRS}$ denotes a SRS triggering period expressed by a unit of a slot(s) where the SRS is configured, $n_S$ denotes a slot index, $N_{SRS\_sym}$ denotes the number of SRS allocation symbols in a slot where the SRS(s) is(are) triggered, and $n_{symbol}$ denotes a symbol index. In Equation, the number of SRS ports is set to 4. When the number of SRS symbols in each SRS slot is set to 4, if an SRS port is mapped to an SRS symbol according to Equation 2, it may be represented as shown in FIG. 12. The UE may implicitly obtain the number of an SRS port mapped to each SRS symbol based on Equation 2.

Figure 13:
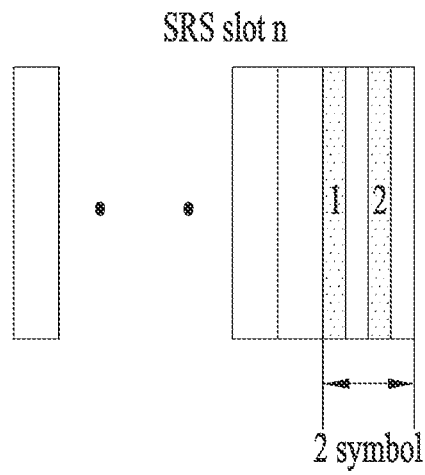
FIG. 13 is a diagram illustrating an SRS port mapping method predefined based on the number of SRS symbols and a numerology configuration.

FIG. 13 is a diagram illustrating a predefined SRS port mapping method based on the number of SRS symbols and a numerology configuration.

The number of an SRS port mapped to each SRS symbol may be determined depending on the number of symbols in a configured SRS slot, the number of SRS ports, and/or different numerologies.

For example, as shown in FIG. 13, when a specific UE is configured with two symbols in an SRS slot (SRS slot n) and the two symbols are configured for UL beam management by extending the SCS from 15 kHz to 30 kHz, if SRS port mapping in this SRS slot is configured by considering SRS switching, SRS sub-symbols and SRS ports mapped thereto may be determined as shown in FIG. 13.

Figure 14:
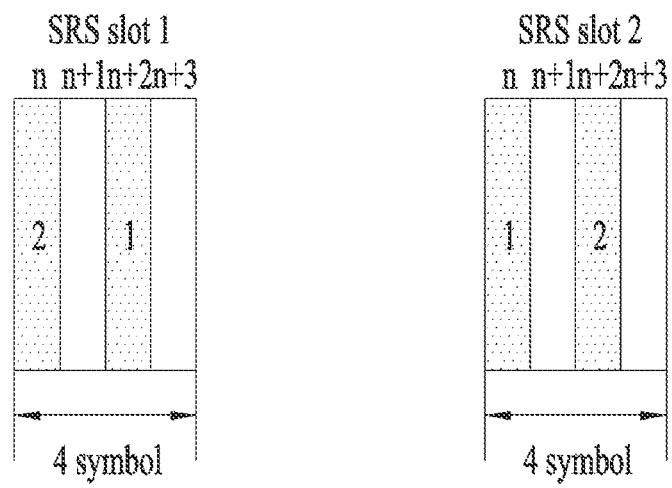
FIG. 14 is a diagram illustrating explicit SRS port to SRS symbol mapping.

FIG. 14 is a diagram illustrating explicit SRS port to SRS symbol mapping.

A BS may explicitly transmit information on the number (value or index) of an SRS port mapped to each SRS symbol to a UE. The BS may provide the SRS symbol index and the SRS port number index corresponding to the SRS symbol index through Layer 1 (e.g., DCI) signaling or Layer 3 (e.g., RRC) signaling.

For example, as shown in FIG. 14, the BS may indicate to the UE that the number of an SRS port mapped to SRS symbol n in SRS slot 1, the number of an SRS port mapped to SRS symbol n+2 in SRS slot 1, the number of an SRS port mapped to SRS symbol n in SRS slot 2, and the number of an SRS port mapped to SRS symbol n+2 in SRS slot 2 are 2, 1, 1, 2, respectively.

Figure 15:
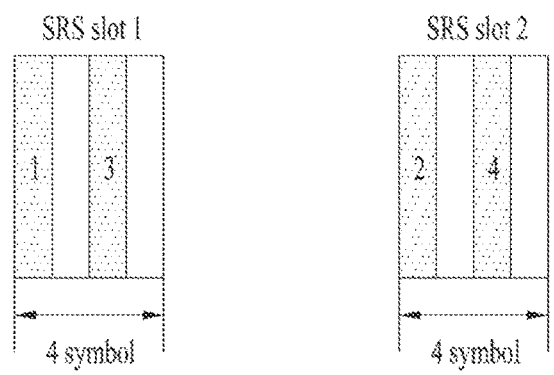
FIG. 15 is a diagram illustrating explicit SRS port to SRS symbol mapping (SRS port group transmission).

FIG. 15 is a diagram illustrating explicit SRS port to SRS symbol mapping (SRS port group transmission).

After configuring an SRS port group, a BS may designate an SRS port group number and SRS ports mapped to a corresponding SRS slot and then inform a UE of the SRS port group number and the SRS ports mapped to the corresponding SRS slot. Thus, in each slot, ports mapped to SRS symbols may be determined from among ports in the SRS port group, and such an SRS port mapping rule may be predetermined and shared by the BS and UE. Alternatively, the BS may determine the SRS port mapping rule and transmit the determined SRS port mapping rule to the UE through Layer 1 (e.g., DCI) signaling or Layer 3 (e.g., RRC) signaling.

For example, as shown in FIG. 15, SRS port groups 1 and 2 are {1,3} and {2,4}, respectively. The BS may transmit SRS port group indexes to the UE to inform that SRS port groups 1 and 2 is mapped to SRS slots 1 and 2, respectively. For a UE that requires an empty symbol in the case of the antenna switching for the SRS transmission, the BS may configure or allocate the SRS as illustrated in FIG. 15. In FIG. 15, the number of SRS ports mapped to each SRS symbol is limited to 1, but this is merely exemplary.

Proposal 2-1

The number (index) of an SRS antenna port to which antenna switching for SRS transmission is applied may be determined depending on the location of a frequency resource allocated for the SRS transmission and a symbol to which the SRS is allocated.

Figure 16:
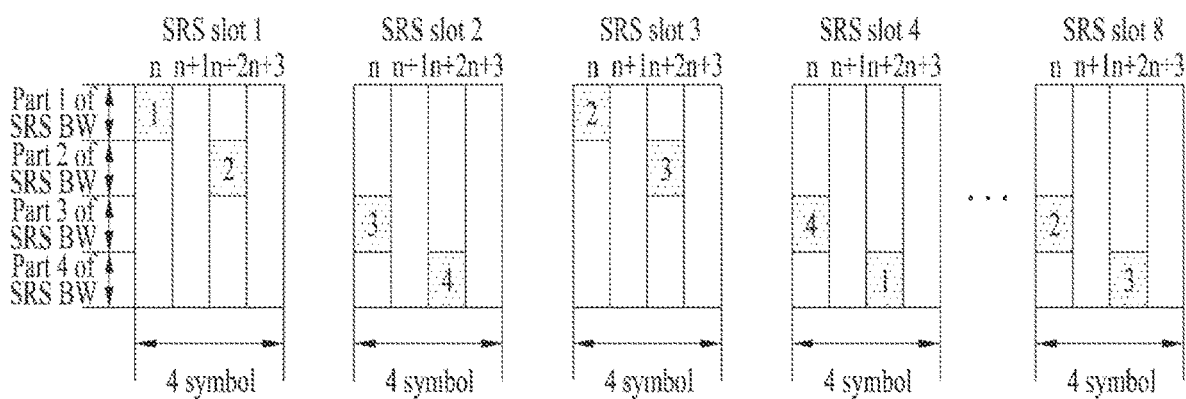
FIG. 16 is a diagram illustrating antenna selection based on SRS transmission resource allocation locations and hopping patterns (K=4).

FIG. 16 is a diagram illustrating antenna selection based on SRS transmission resource allocation locations and hopping patterns (K=4).

When symbol-level hopping is applied for the SRS transmission, the number (or index) of the SRS port where the antenna switching for the SRS transmission is applied may be determined by the location of a SRS bandwidth (BW) to which the hopping is applied and/or the index of the symbol to which the SRS is allocated. Equation 3 below shows the SRS port number allocation illustrated in FIG. 16 based on a mathematical expression.

[Equation 3]

$$a(n_{SRS}) =$$

$$\begin{cases} \left(n_{SRS} + \gamma \left\lfloor \frac{n_{SRS}}{4} \right\rfloor + \beta \lfloor n_{SRS}/K \rfloor\right) \bmod 4 & \text{when } K \text{ is even} \\ n_{SRS} \bmod 4 & \text{when } K \text{ is odd} \end{cases}$$

$$, K \text{ is set to } 4. n_{SRS} = \left\lfloor \frac{n_s}{T_{SRS}} \right\rfloor \times N_{SRS\_sym} + \left\lfloor \frac{n_{symbol}}{2} \right\rfloor$$

$$\gamma = \begin{cases} 0 & \text{where } K \bmod 6 = 0 \\ 1 & \text{otherwise} \end{cases}, \beta = \begin{cases} 1 & \text{where } K \bmod 6 = 0 \\ 0 & \text{otherwise} \end{cases}$$

Figure 17:
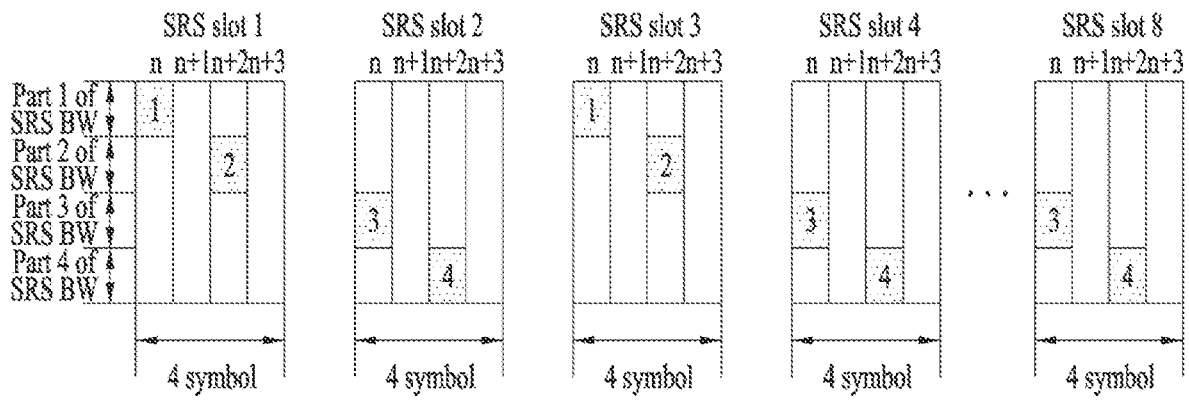
FIG. 17 is a diagram illustrating antenna selection based on fixed SRS transmission frequency resource locations (K=4).

FIG. 17 is a diagram illustrating antenna selection based on fixed SRS transmission frequency resource locations (K=4).

It may be considered that the antenna selection is dependent only on the SRS transmission resource location. In addition, it may also be considered that sounding performance is improved by energy combining.

As shown in FIG. 17, SRS port mapping may be configured such that SRS port number 1 is always configured for SRS BW part 1 (part 1 of SRS BW). In addition, SRS port number 2, SRS port number 3, and SRS port number 4 may be configured for SRS BW part 2 (part 2 of SRS BW), SRS BW part 3 (part 3 of SRS BW), and SRS BW part 4 (part 4 of SRS BW), respectively. Information about the SRS port mapping configuration may be provided by the BS to the UE through DCI, MAC-CE, or RRC signaling.

Proposal 3

Proposal 3 may be performed by a UE and a BS before the bases station indicates resource allocation and/or SRS port allocation for SRS transmission. The items indicated by the BS according to Proposals 1 and 2 may be made based on feedback on UE antenna switching capability for the SRS transmission.

Figure 18:
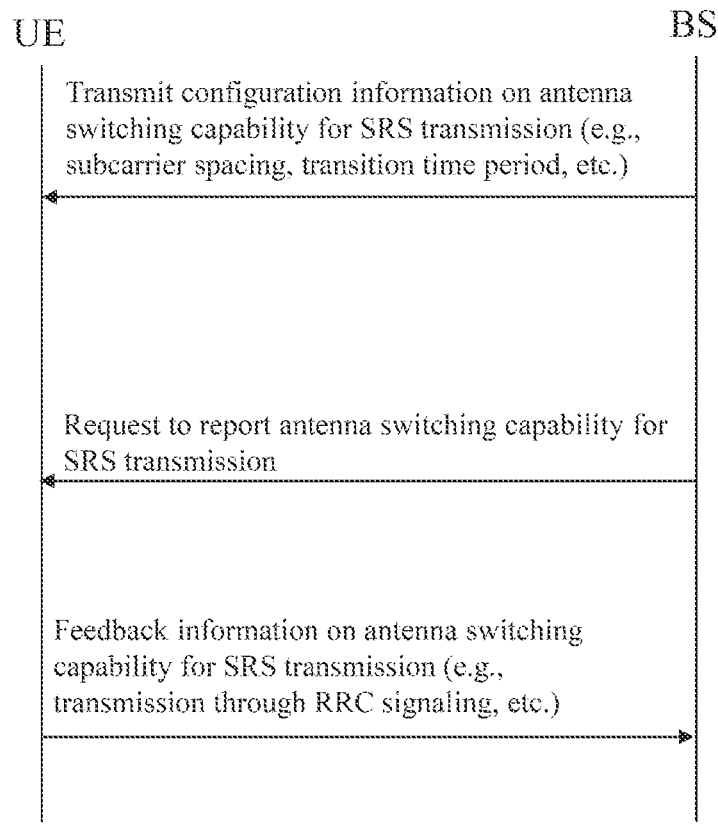
FIG. 18 is a diagram illustrating a procedure for reporting antenna switching capability for SRS transmission.

FIG. 18 is a diagram illustrating a procedure for reporting antenna switching capability for SRS transmission.

First, a BS may transmit to a UE a message requesting to report or feed back the antenna switching capability for the SRS transmission. In response to the message, the UE may feed back information about the SRS antenna switching capability to the BS. Specifically, the UE may report or feed back the information about the SRS antenna switching capability by considering a transition time during the antenna switching for the SRS transmission The feedback may be a flag indicating whether the corresponding UE is capable of performing the SRS transmission on consecutive symbols. Regarding the feedback, when numerology change is required for UL beam management, if the BS provides SCS information (e.g., 5 kHz, 30 kHz, 60 kHz, etc.) for an SRS configuration together with an SRS slot configuration to the UE, the UE may recognize antenna switching capability of the UE, determine whether to empty a corresponding symbol(s) between symbols, and then inform the feedback of the determination to the BS.

The feedback may include information on a numerology (e.g., SCS) to implicitly indicate whether the UE is capable of performing the SRS transmission on consecutive symbols. Alternatively, the feedback may include information on the maximum SCS where consecutive SRS symbols are capable of being allocated. For example, if consecutive SRS symbols are capable of being allocated up to the 30 kHz SCS during the antenna switching for the SRS transmission, the feedback may include an index corresponding to the 30 kHz SCS.

Table 18 shows an example of SRS switching capability indexes for SRS transmission. The information in Table 18 may be provided by the BS to the UE through RRC signaling.

TABLE 18

| SRS switching capability index | Subcarrier spacing | | | |
|---|---|---|---|---|
| | 15 kHz | 30 kHz | 60 kHz | 120 kHz |
| 0 | ○ | X | X | X |
| 1 | ○ | ○ | X | X |

TABLE 18-continued

| SRS switching capability index | Subcarrier spacing | | | |
|---|---|---|---|---|
| | 15 kHz | 30 kHz | 60 kHz | 120 kHz |
| 2 | ○ | ○ | ○ | X |
| 3 | ○ | ○ | ○ | ○ |

The feedback may include information on transition time periods based on the antenna switching, which allows the BS checks whether the UE is capable of performing the SRS transmission on consecutive symbols. The BS may provide the information on the transition time periods shown in Table 18 to the UE through higher layer (RRC) signaling, and the UE may feed back the transition time periods based on its antenna switching capability to the BS.

Table 19 shows another example of antenna switching capability indexes for SRS transmission. The information in Table 19 may be provided by the BS to the UE through RRC signaling.

TABLE 19

| SRS switching capability index | Antenna switching transition time interval | | | |
|---|---|---|---|---|
| | In 4.6875 us (15 kHz with respect to CP length) | In 2.34375 us (30 kHz) | In 1.171875 us (60 kHz) | In 0.5859375 us (120 kHz) |
| 0 | ○ | X | X | X |
| 1 | ○ | ○ | X | X |
| 2 | ○ | ○ | ○ | X |
| 3 | ○ | ○ | ○ | ○ |

The BS may provide the information on the transition time periods shown in Table 19 to the UE through higher layer (RRC) signaling, and the UE may feed back a transition time period based on its antenna switching capability to the BS.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is industrially applicable to various wireless communication systems including the 3GPP LTE/LTE-A system, 5G communication system.

What is claimed is:

1. A method of transmitting a sounding reference signal (SRS) by a user equipment (UE), the method comprising:
receiving, from a base station (BS), SRS configuration information related to configuration of SRS resources for antenna switching;
transmitting, to the BS, a first SRS on a first antenna port of a first SRS resource based on the SRS configuration information; and
transmitting, to the BS, a second SRS on a second antenna port of a second SRS resource based on the SRS configuration information,
wherein the first SRS resource and the second SRS resource are configured within a same slot, and
wherein at least one empty symbol is configured between the first SRS resource and the second SRS resource based on a subcarrier spacing configured for the UE.

2. The method of claim 1,
wherein the at least one empty symbol is configured as a gap for the antenna switching.

3. The method of claim 1, further comprising:
receiving, from the BS, information representing whether the at least one empty symbol is configured between the first SRS resource and the second SRS resource.

4. The method of claim 3,
wherein the information is received through radio resource control (RRC) signaling, a medium access control channel element (MAC CE) or downlink control information (DCI).

5. The method of claim 1,
wherein the first SRS resource and the second SRS resource configured within a plurality of consecutive Orthogonal Frequency Division Multiplexing (OFDM) symbols of the same slot.

6. The method of claim 1,
wherein the SRS configuration information further includes a number of antenna ports for transmission of the SRS.

7. A user equipment (UE) for transmitting a sounding reference signal (SRS), the UE comprising:
at least one transceiver;
at least one processor; and
at least one memory operably connected to the at least one processor and configured to store instructions for causing the at least one processor to perform a specific operation when executed,
wherein the specific operation comprises:
receiving, from a base station (BS), SRS configuration information related to configuration of SRS resources for antenna switching;
transmitting, to the BS, a first SRS on a first antenna port of a first SRS resource based on the SRS configuration information; and
transmitting, to the BS, a second SRS on a second antenna port of a second SRS resource based on the SRS configuration information,
wherein the first SRS resource and the second SRS resource are configured within a same slot, and
wherein at least one empty symbol is configured between the first SRS resource and the second SRS resource based on a subcarrier spacing configured for the UE.

8. The UE of claim 7,
wherein the at least one empty symbol is configured as a gap for the antenna switching.

9. The UE of claim 7,
wherein the specific operation further comprises receiving, from the BS, information representing whether the at least one empty symbol is configured between the first SRS resource and the second SRS resource.

10. The UE of claim 9,
wherein the information is received through radio resource control (RRC) signaling, a medium access control channel element (MAC CE) or downlink control information (DCI).

11. The UE of claim 7,
wherein the first SRS resource and the second SRS resource configured within a plurality of consecutive Orthogonal Frequency Division Multiplexing (OFDM) symbols of the same slot.

12. The UE of claim 7,
wherein the SRS configuration information further includes a number of antenna ports for transmission of the SRS.

13. A method of receiving a sounding reference signal (SRS) by a base station (BS), the method comprising:
transmitting, to a user equipment (UE), SRS configuration information related to configuration of SRS resources for antenna switching;
receiving, from the UE, a first SRS on a first antenna port of a first SRS resource based on the SRS configuration information; and
receiving, from the UE, a second SRS on a second antenna port of a second SRS resource based on the SRS configuration information,
wherein the first SRS resource and the second SRS resource are configured within a same slot, and
wherein at least one empty symbol is configured between the first SRS resource and the second SRS resource based on a subcarrier spacing configured for the UE.

14. A base station (BS) for receiving a sounding reference signal (SRS), the BS comprising:
at least one transceiver;
at least one processor; and
at least one memory operably connected to the at least one processor and configured to store instructions for causing the at least one processor to perform a specific operation when executed,
wherein the specific operation comprises:
transmitting, to a user equipment (UE), SRS configuration information related to configuration of SRS resources for antenna switching;
receiving, from the UE, a first SRS on a first antenna port of a first SRS resource based on the SRS configuration information; and
receiving, from the UE, a second SRS on a second antenna port of a second SRS resource based on the SRS configuration information,
wherein the first SRS resource and the second SRS resource are configured within a same slot, and
wherein at least one empty symbol is configured between the first SRS resource and the second SRS resource based on a subcarrier spacing configured for the UE.

* * * * *